(12) United States Patent
Ishida

(10) Patent No.: US 7,360,176 B2
(45) Date of Patent: Apr. 15, 2008

(54) SYMBOL SELECTOR AND SYMBOL SELECTION METHOD

(75) Inventor: Takehisa Ishida, Tokyo (JP)

(73) Assignee: Sony Corporation (JP)

( * ) Notice: Subject to any disclaimer, the term of this patent is extended or adjusted under 35 U.S.C. 154(b) by 691 days.

(21) Appl. No.: 10/854,222

(22) Filed: May 27, 2004

(65) Prior Publication Data

US 2005/0030286 A1 Feb. 10, 2005

(30) Foreign Application Priority Data

Jun. 9, 2003 (JP) ............................ P2003-164218

(51) Int. Cl.
G09G 5/08 (2006.01)

(52) U.S. Cl. ...................................... 715/863; 715/862

(58) Field of Classification Search ................ 715/863, 715/856, 858, 862, 835, 857, 700, 751, 759, 715/769, 770; 345/173, 179
See application file for complete search history.

(56) References Cited

U.S. PATENT DOCUMENTS 6,567,072 B2 * 5/2003 Watanabe ................... 345/161

FOREIGN PATENT DOCUMENTS

| JP | 07-200127 | 8/1995 |
|---|---|---|
| JP | 3045891 | 3/2000 |
| JP | 2002-169645 | 6/2002 |

* cited by examiner

*Primary Examiner*—Doug Hutton
*Assistant Examiner*—Daeho D. Song
(74) *Attorney, Agent, or Firm*—Rader Fishman & Grauer PLLC; Ronald P. Kananen

(57) ABSTRACT

A symbol selector comprising a storage unit which stores a symbol list including predetermined arrayed symbols; a manipulator unit for manipulating a pointing position of a virtual pointer which moves virtually over the symbol list stored in the storage unit; a sensor unit which detects acceleration per unit of time that is applied to the manipulator unit; a motion direction determination unit which determines a motion direction of the virtual pointer, based on a detection result from the sensor unit; a motion unit which moves the virtual pointer in units of symbols in the motion direction determined by the motion direction determination unit; and a selection unit which selects a symbol currently pointed to by the virtual pointer moved by the motion unit.

15 Claims, 6 Drawing Sheets

| あ | ゃ | わ | ら | や | ま | は | な | た | さ | か | あ |
|---|---|---|---|---|---|---|---|---|---|---|---|
| ぃ | ぃ | を | り | ゐ | み | ひ | に | ち | し | き | い |
| ぅ | ゅ | ん | る | ゆ | む | ふ | ぬ | つ | す | く | う |
| っ | ぇ | ゛ | れ | ゑ | め | へ | ね | て | せ | け | え |
| ー | ょ | 。 | ろ | よ | も | ほ | の | と | そ | こ | お |

FIG.2A

| a | f | k | p | u | z | A | F | K | P | U | Z | 0 | 5 |
|---|---|---|---|---|---|---|---|---|---|---|---|---|---|
| b | g | l | q | v | . | B | G | L | Q | V | ? | 1 | 6 |
| c | h | m | r | w | , | C | H | M | R | W | : | 2 | 7 |
| d | i | n | s | x | " | D | I | N | S | X | ; | 3 | 8 |
| e | j | o | t | y | ! | E | J | O | T | Y | ／ | 4 | 9 |

FIG.2B

SYMBOL SELECTOR AND SYMBOL SELECTION METHOD

BACKGROUND OF THE INVENTION

1. Field of the Invention

The present invention relates to a symbol selector and a symbol selection method for inputting a symbol and more specifically to a symbol selector and a symbol selection method for selecting a predetermined symbol from a predetermined list.

2. Description of the Related Art

In general, characters are inputted conventionally to information processing apparatuses by keyboards. However, a keyboard occupies a relatively large area and is therefore not handy to carry. Hence, a method has been adopted to reduce the area of the symbol selector of a keyboard by reducing the number of keys. For example, in a character input method that has been widely used, plural characters are assigned to each numerical key, so that the assigned characters show up in turns by pressing a key repeatedly plural times.

However, in this method it is difficult to understand intuitively to which of the numerical keys a desired character is assigned and how many times the numerical key needs to be pressed to select the desired character. This causes a problem in that users have to be accustomed to these factors.

In another kind of technique, selection of characters as described above is achieved independently from key manipulation. For example, an acceleration detector which detects physical motion effected externally on a terminal is provided, and a trace of the motion effected on the terminal is obtained based on a detection output from the acceleration detector. The trace of the motion is displayed on a display unit. If the acceleration detector detects that further motion to fix the trace is effected on the terminal with the trace displayed, the trace of the former motion is recognized as an inputted character (see Jpn. Pat. Appln. Laid-Open Publication No. 2002-169645.

In this method, however, if the acceleration detector has a low detection sensitivity to acceleration, physical motion effected externally cannot be accurately grasped. Therefore, the motion trace cannot be drawn based on the motion. As a result, another problem arises in that a very long time is needed until an arbitrary character is inputted. On the contrary, if the detection sensitivity of the acceleration detector is high, physical vibration that a user unintentionally makes is detected with oversensitivity, and a wrong motion trace is drawn. As a result, a very long time is needed until an arbitrary character is inputted, too.

There also is a method of using a pen-type manipulator to compensate for the drawbacks of the key input method. For example, a desired character is selected from a displayed list having a keyboard-like appearance on a display unit by touching the list with a pen. Alternatively, the trace of motion of a pen is detected, and features of a character are detected from the detection result, to achieve character recognition (see Jpn. Pat. Publication 3,045,891). The character recognition of this kind requires highly advanced hardware and software, and it is difficult to lower the price of a device of this kind. In addition, erroneous character recognition occurs frequently. This kind of character recognition is not always easy to use.

SUMMARY OF THE INVENTION

Hence, the present invention has been proposed in view of the actual situation described above and has an object of providing a symbol selector and a symbol selection method which save space and allow selection of desired symbols by easy manipulation.

To solve the problems described above, a symbol selector according to the present invention comprises: a storage unit which stores a symbol list including predetermined arrayed symbols; a manipulator unit for manipulating the pointing position of a pointer (hereinafter referred to as a virtual pointer) which moves virtually over the symbol list stored in the storage unit; a sensor unit which detects acceleration per unit of time that is applied to the manipulator unit; a motion direction determination unit which determines the motion direction of the virtual pointer, based on a detection result from the sensor unit; a motion unit which moves the virtual pointer in units of symbols in the motion direction determined by the motion direction determination unit; and a selection unit which selects a symbol currently pointed to by the virtual pointer moved by the motion unit.

To solve the problems described above, a symbol selection method according to the present invention comprises: a manipulation step of manipulating by a manipulator unit a pointing position of a pointer (hereinafter referred to as a virtual pointer) which moves virtually over a symbol list which includes predetermined arrayed symbols and is stored in a memory; a sensing step of detecting acceleration which is applied per unit of time to the manipulator unit from the manipulation step; a motion direction determination step of determining the motion direction of the virtual pointer over the symbol list, based on the detection result from the sensor step; a motion step of moving the virtual pointer in units of symbols in the motion direction determined in the motion direction determination step; and a selection step of selecting a desired symbol when the virtual pointer moved in the motion step points to a symbol.

As described above, the symbol selector according to the present invention comprises: a storage unit which stores a symbol list formed of predetermined arrayed symbols; a manipulator unit for manipulating a virtual pointer which moves virtually over the symbol list stored in the storage unit; a sensor unit which detects acceleration that is applied per unit of time to the manipulator unit; and a processing unit which determines the motion direction of the virtual pointer based on a detection result from the sensor unit, moves the virtual pointer to a desired symbol, and selects the symbol. Therefore, the direction in which an operator manipulates the manipulator unit can be detected exactly. In addition, the virtual pointer moves over the symbol list having a known array of symbols, so that the operator can understand intuitively the direction and position where a desired symbol should be selected without displaying the whole symbol list.

In the symbol selection method according to the present invention: a symbol list formed of predetermined arrayed symbols is stored in memory; a virtual pointer on the symbol list is manipulated by a manipulator unit; acceleration that is applied per unit of time to the manipulator unit is detected; a motion direction in which the virtual pointer moves over the symbol list is detected on the basis of the detection result; the virtual pointer is moved in units of symbols in the detected direction; and when the virtual pointer points a to desired symbol, the symbol is selected. Therefore, the direction in which an operator manipulates the manipulator unit can be detected exactly. In addition, the virtual pointer moves over the symbol list having a known array of symbols, so that the operator can understand intuitively the direction and position where a desired symbol should be selected without displaying the whole symbol list.

BRIEF DESCRIPTION OF THE DRAWINGS

FIGS. 2A and 2B are schematic diagrams showing examples of arrays of symbols;

DETAILED DESCRIPTION OF THE INVENTION

Preferred embodiments of the present invention will now be described in detail with reference to the drawings. The embodiments below are concrete examples of the present invention and, hence, are restricted by a variety of technically preferable limitations. However, the scope of the present invention is not limited to these embodiments, unless a particular description which points out a particular limitation to the present invention is specified in the description below.

Figure 1:
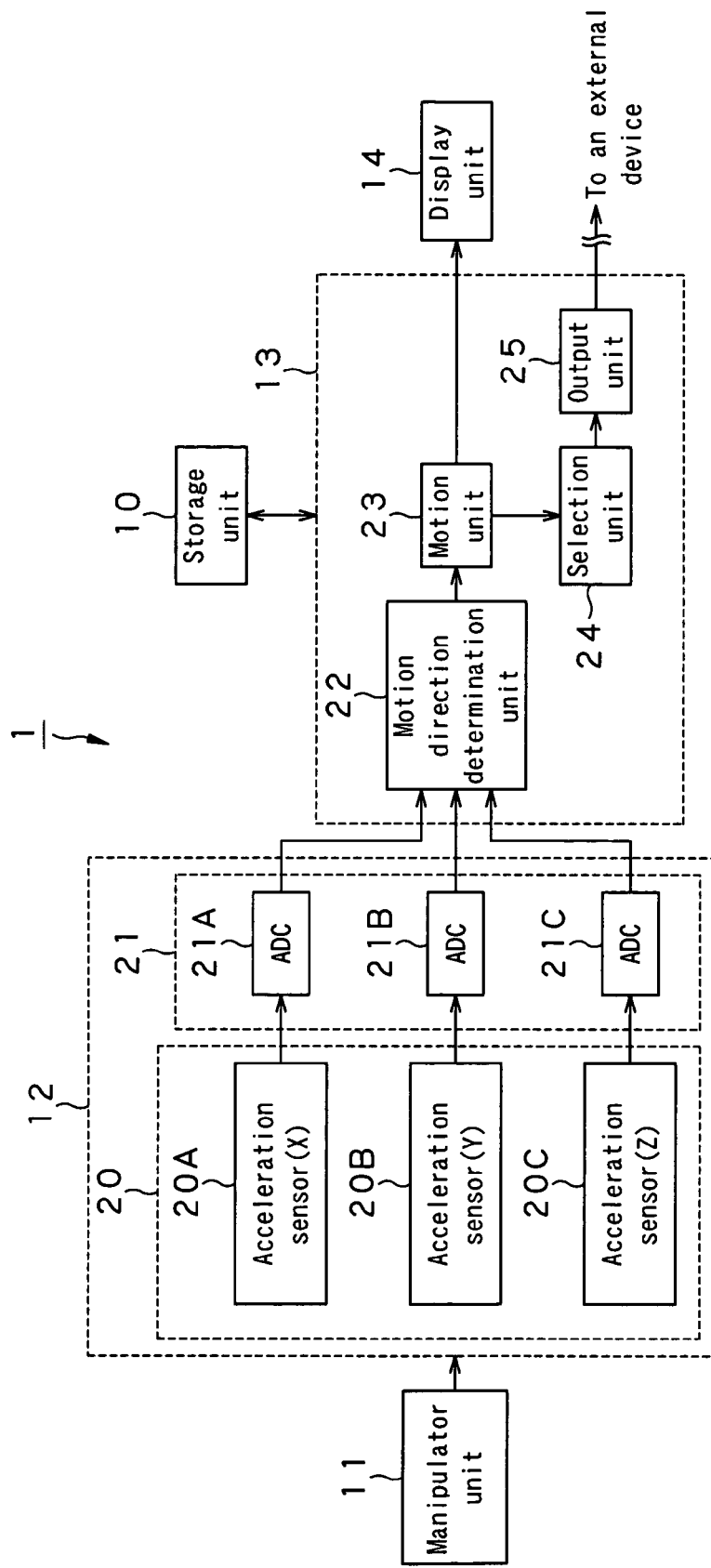
FIG. 1 is a block diagram showing the structure of a symbol selector according to the present invention.

The present invention is applied to, for example, a symbol selector 1 as shown in FIG. 1. The symbol selector 1 has a storage unit 10 which stores a symbol list including predetermined arrayed symbols, a manipulator unit 11 for manipulating the position of a virtual pointer which moves virtually over the symbol list stored in the storage unit 10, a sensor unit 12 which detects acceleration generated by the motion of the manipulator unit 11, a processor unit 13 which performs a predetermined processing based on the acceleration detected by the sensor 12 and selects a desired symbol from the symbol list stored in the storage unit 10, and a display unit 14 which displays the symbol selected by the processor 13.

The storage unit 10 stores a symbol list (hereinafter called a "character list") consisting of fifty Japanese characters (plus punctuation marks, characters for palatalized or labiovelarized syllables, etc) arrayed in a matrix and a symbol list (hereinafter called a "alpha-numeral list") consisting of alpha-numerals, for example, as shown in FIGS. 2A and 2B. These symbol lists may be provided in a planar direction or may be arranged in a virtual vertical hierarchy classified into different types of symbols. In addition, the array of symbols forming each symbol list may be arranged in a manner in which the operator can recognize intuitively the array. For example, as shown in FIG. 2, the array need not be like "あいうえお" (uttered as A I U E O) in the column direction but may be like "あいうえお" in the line direction.

Figure 4:
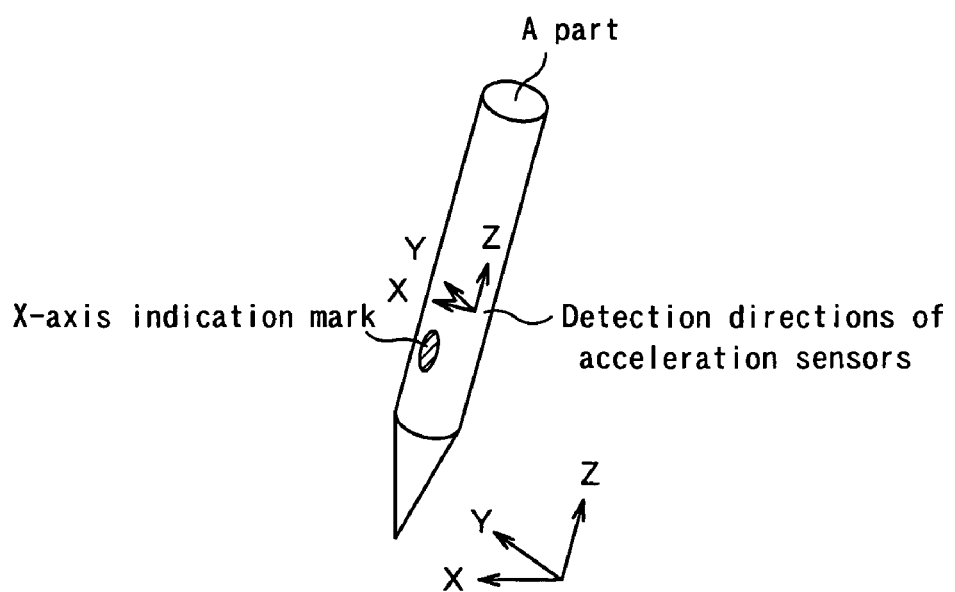
FIG. 4 is a perspective view showing the shape of a manipulator unit.

The manipulator unit 11 has a shape that is easy for the operator to manipulate, e.g., a pen-like shape, as shown in FIG. 4. The operator manipulates the manipulator unit 11 to operate the pointing position of the virtual point which virtually moves over the symbol lists stored in the storage unit 10.

The sensor unit 12 has an acceleration sensor 20 which detects acceleration applied from at least two directions perpendicular to each other (hereinafter called "planar directions"), and an ADC (analog digital converter) 21 which performs an encoding processing on signals detected by the acceleration sensor 20.

In the embodiment of the present invention, it is presumed that the acceleration sensor 20 includes acceleration sensors (X) 20A, (Y) 20B, and (Z) 20C which respectively detect acceleration in the three directions in which the manipulator unit 11 is manipulated by the operator, i.e., in the planar directions and a direction perpendicular (hereinafter called a "vertical direction") to the planar directions. The ADC 21 includes an ADC 21A which performs an encoding processing on signals detected by the acceleration sensor (X) 20A, an ADC 21B which performs an encoding processing on signals detected by the acceleration sensor (Y) 20B, and an ADC 21C which performs an encoding processing on signals detected by the acceleration sensor (Z) 20C.

The sensor unit 12 is mounted at a predetermined position of the manipulator unit 11, and is constructed of a small, lightweight, and commercially available piezoelectric element or silicon micromachine, in order to reduce burdens on the operator.

The processor unit 13 includes a motion direction determination unit 22, a motion unit 23, a selection unit 24, and an output unit 25. Based on signals (digital signals) supplied from the sensor unit 12, the motion direction determination unit 22 analyzes the direction in which the manipulator unit 11 is manipulated by the operator, and determines the motion direction of the virtual pointer moving on a symbol list stored in the storage unit 10, in accordance with motion of the manipulator unit 11. The motion unit 23 moves the virtual pointer in units of symbols, in the direction of the virtual pointer determined by the motion direction determination unit 22. The selection unit 24 selects a symbol currently pointed to by the virtual pointer moved by the motion unit 23. The output unit 25 outputs the symbol selected by the selection unit 24.

The motion direction determination unit 22 is connected to the sensor unit 12, the motion unit 23 and the selection unit 24, and is constructed of a microprocessor which determines a motion direction of the virtual pointer by analyzing a signal supplied from the sensor unit 12, and supplies a determination result to the motion unit 23, a ROM (Read Only Memory) or a flash memory which stores an operation program of the microprocessor, and a DRAM (Dynamic Random Access Memory) which is a work area of the microprocessor.

The motion unit 23 is connected to the motion direction determination unit 22, the selection unit 24, and the display unit 14 (described latter), and is constructed of a memory which stores the symbol pointed by the virtual pointer, the symbol stored in the memory, and a microprocessor which moves the symbol to be moved next, based on a determination result supplied from the motion direction determination unit 22. The microprocessor of the motion unit 23 may be used also as the microprocessor of the motion direction determination unit 22. When the virtual pointer is moved in the direction determined by the motion direction determination unit 22, the motion unit 23 may also move the virtual pointer in relation to a predetermined symbol (e.g., "あ") as a reference, without referring to the symbol stored in the memory. For example, if "ふ" (uttered as "fu") which is close to the center of the fifty-Japanese-character list is set as the predetermined symbol, characters such as "を" (uttered as "wo") and "ん" (uttered as "n") which are far from "あ" can be selected by a relatively small number of manipulations.

The motion unit 23 outputs information of the symbol pointed to currently by the virtual pointer to the display unit 14 and the selection unit 24.

The selection unit 24 is connected to the motion unit 23 and the output unit 25, and selects the symbol pointed to currently by the virtual pointer. The selection unit 24 may select the symbol currently pointed to by the virtual pointer, for example, in accordance with a predetermined manipulation made by the operator, or may select automatically the pointed symbol when the virtual pointer keeps pointing to one single symbol over a predetermined time period. The selection unit 24 transmits information on the selected symbol to the output unit 25.

The output unit 25 outputs the symbol selected by the selection unit 24 to an external device which performs information processings via wired or wireless communication. The output unit 25 is constructed, for example, of a wireless communication unit and transmits the symbol selected by the selection unit 24 to the external device. The wireless communication unit adopts the Bluetooth standard which uses a frequency band of 2.4 GHz, so that wires between the symbol selector and the external device are unnecessary.

The display unit 14 is connected to the motion unit 23 and is constructed of a known display device such as a liquid crystal panel or an EL (Electro-Luminescence) panel. The display panel displays the symbol currently pointed to by the virtual pointer. Note that the display unit 14 may have a size (display area) that is enough to display at least the symbol pointed to by the virtual pointer. If the display area of the display unit 14 is thus small, for example, the display unit can be mounted on the part A of the manipulator unit 11, as shown in FIG. 4. When the operator manipulates the manipulator unit 11, the operator can select easily a desired symbol, seeing symbols displayed on the display unit 14 mounted on the part A of the manipulator unit 11.

A description will now be made of specific operations of the motion direction determination unit 22 which determines the manipulation direction (i.e., the motion direction of the virtual pointer) of the manipulator unit 11, based on detection results from the acceleration sensor 20. In the description below, the lengthwise-axis direction of the manipulator unit 11 is the Z-direction and planar directions perpendicular to the Z-direction are X- and Y-directions. A mark which indicates a basic direction (e.g., the positive direction in the X-axis) to help the operator make manipulation is marked on the surface of the manipulator unit 11, as shown in FIG. 4. The operator holds the manipulator unit 11 with the mark oriented forward. In this state, the direction to the substantial right side of the operator is taken as the positive direction in the Y-axis, and the substantial upper side of the operator is taken as the positive direction in the Z-axis. Suppose also that the acceleration sensor 20 is mounted in the manipulator unit 11 such that the directions in which acceleration is detected are along the X-axis, Y-axis, and Z-axis.

Figure 5:
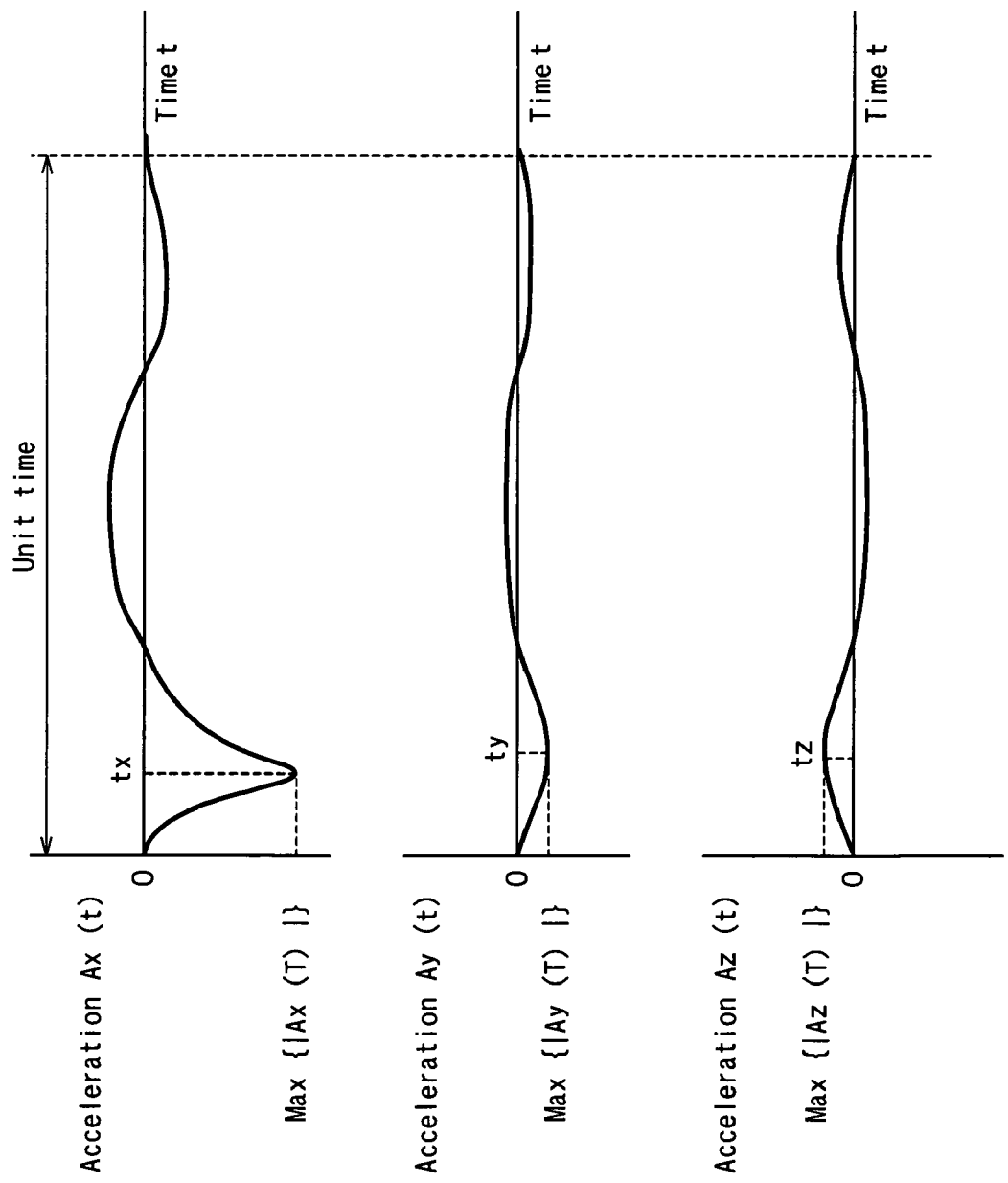
FIG. 5 are graphs showing the state when acceleration applied to the manipulator unit is detected by an acceleration sensor.
Figure 6:
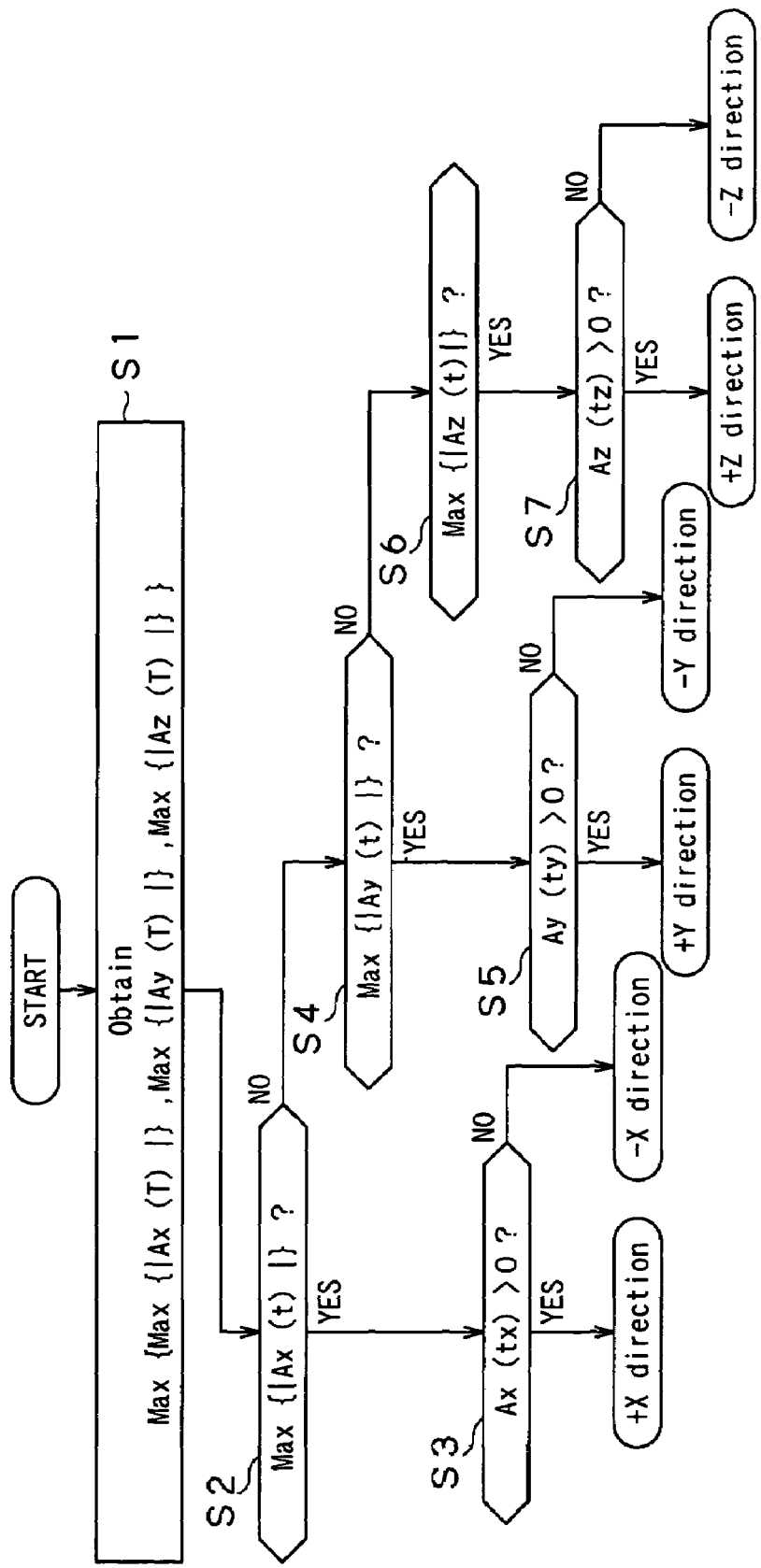
FIG. 6 is a flowchart showing a procedure in which the motion direction of a virtual pointer is determined by a motion direction determination unit.

For example, when the manipulator unit 11 is moved toward the operator (e.g., in the negative direction in the X-axis), i.e., when the operator makes a manipulation to write an alpha-numeral "1", the acceleration sensor 20 detects changes in acceleration per unit of time, as shown in FIG. 5. The acceleration sensor 20 outputs the detected changes in acceleration to the motion direction determination unit 22. Specific operations of the motion direction determination unit 22 will now be described with reference to the flowchart shown in FIG. 6.

In step S1, the motion direction determination unit 22 obtains the maximum value (MAX) of the absolute value of acceleration per unit of time in each of the X- Y- and Z-directions. That is, the motion direction determination unit 22 obtains Max{|Ax(t)|}, Max{|Ay(t)|}, and Max{|Az(t)|} where the accelerations per unit of time in the respective directions are respectively Ax(t), Ay(t), and Az(t).

In step S2, the motion direction determination unit 22 obtains the greatest value (Max{Max{|Ax(t)|}, Max{|Ay(t)|}, Max{|Az(t)|}}) among the three values obtained in step S1. If the Max{|Ax(t)|} is the greatest, the motion direction determination unit 22 goes to step S3. Otherwise, the unit 22 goes to step S4.

In step S3, if the motion direction determination unit 22 determines that the manipulation direction (i.e., the motion direction of the virtual pointer) is along the X-axis and if the time when |Ax(t)| is maximized is tx, the motion direction determination unit 22 determines whether Ax(tx)>0 is satisfied or not. If Ax(tx)>0 is satisfied, it is determined that the manipulation is made in the positive direction in the X-axis. If Ax(tx)>0 is not satisfied, i.e., if Ax(tx)<0 exists, the manipulation is determined as being made in the negative direction in the X-axis.

In step S4, if Max{|Ay(t)|} is the greatest among the three values obtained in step S1, the motion direction determination unit 22 goes to step S5. Otherwise, the motion direction determination unit 22 goes to step S6.

In step S5, if the motion direction determination unit 22 determines that the manipulation direction (i.e., the motion direction of the virtual pointer) is along the Y-axis and if the time when |Ay(t)| is maximized is ty, the motion direction determination unit 22 determines whether Ay(ty)>0 is satisfied or not. If Ay(ty)>0 is satisfied, it is determined that the manipulation is made in the positive direction in the Y-axis. If Ay(ty)>0 is not satisfied, i.e., if Ay(ty)<0 exists, the manipulation is determined as being made in the negative direction in the Y-axis.

In step S6, the motion direction determination unit 22 confirms that Max{|Az(t)|} is the greatest among the three values obtained in step S1, and then goes to step S7.

In step S7, if the motion direction determination unit 22 determines that the manipulation direction (i.e., the motion direction of the virtual pointer) is along the Z-axis and if the time when |Az(t)| is maximized is tz, the motion direction determination unit 22 determines whether Az(tz)>0 is satisfied or not. If Az(tz)>0 is satisfied, it is determined that the manipulation is made in the positive direction in the Z-axis. If Az(tz)>0 is not satisfied, i.e., if Az(tz)<0 exists, the manipulation is determined as being made in the negative direction in the Z-axis.

The motion unit 23 moves the virtual pointer in units of symbols, in the motion direction supplied from the motion direction determination unit 22. The selection unit 24 selects the symbol currently pointed to by the virtual pointer.

A description will now be made of the operations for selecting a character string of "そうさ" (uttered as "sousa" in the meaning of manipulation) by the symbol selector 1 according to the present invention. The following description supposes that the character list shown in FIG. 2A is used as a symbol list and a character "あ" is selected as the initial state where a character input is started (e.g., "あ" is displayed on the display unit 14).

At first, the operator moves the manipulator unit 11 to the left or manipulates the manipulator unit 11 to swing to the left (such that the manipulator unit 11 draws a lateral line from the right to the left), thus applying acceleration to the manipulator unit 11 in the negative direction in the Y-axis. The sensor unit 12 detects acceleration per unit of time that is applied to the manipulator unit 11, and supplies the detection result to the motion direction determination unit 22. The motion direction determination unit 22 determines the motion direction of the virtual pointer to be the "−Y direction", based on the detection result supplied from the sensor unit 12, and outputs the determination result to the motion unit 23. The motion unit 23 moves the virtual pointer to the next character "か" (uttered as "ka") in the left side from "あ", based on the character "あ" stored in the memory (and pointed to currently by the virtual pointer) and the determination result supplied from the motion direction determination unit 22. The result of this motion is outputted rapidly on the display unit 14, and the character "か" is displayed on the display unit 14. At this time, the motion unit 23 makes the memory store the character "か" pointed to by the virtual pointer (e.g., the content stored in the memory is changed from "あ" to "か").

Further, the operator makes the same manipulation from the right to the left as made before, thereby applying acceleration to the manipulator unit 11 in the negative direction in the Y-axis. The sensor unit 12 detects the acceleration per of unit time that is thus applied to the manipulator unit 11, and supplies the detection result to the motion direction determination unit 22. Based on the detection result supplied from the sensor unit 12, the motion direction determination unit 22 determines the motion direction of the virtual pointer to be the "−Y direction" and outputs the determination result to the motion unit 23. The motion unit 23 moves the virtual pointer to the next character "さ" (uttered as "sa") in the left side from the character "か", based on the character "か" stored in the memory and the determination result supplied from the motion direction determination unit 22. The result of this motion is outputted to the display unit 14 like the motion described above, and the character "さ" is displayed on the display unit 14. At this time, the motion unit 23 makes the memory store the character "さ" pointed to by the virtual pointer.

Next, the operator makes a manipulation to pull the manipulator unit 11 toward the operator, i.e., the manipulator unit 11 is manipulated to draw the alpha-numeral "1", thus applying acceleration to the manipulator unit 11 in the negative direction in the X-axis. The sensor unit 12 detects the acceleration per unit of time that is thus applied to the manipulator unit 11 and supplies the detection result to the motion direction determination unit 22. As the sensor unit 12, the motion direction determination unit 22, and the manipulator unit 11 operate as described above, the symbol selector 1 moves the virtual pointer from the character "さ" to the character "し" ((uttered as "shi"). This manipulation procedure is repeated three times, and the virtual pointer accordingly moves to "す" (uttered as "su"), "せ" (uttered as "se"), and "そ" (uttered as "so"). Further, in response to a manipulation made by the operator (e.g., the manipulator unit 11 is moved quickly twice downward (in the −Z direction)), the selection unit 24 selects the character "そ" pointed to by the virtual pointer. After the character is thus selected by the selection unit 24, the virtual pointer returns to the initial state (where "あ" is selected).

The symbol selector 1 performs the same operations as described above and moves the virtual pointer to select the characters "う" (uttered as "u") and "さ". The symbol selector 1 then selects these selected symbols to the external device via the output unit 25.

Figure 7:
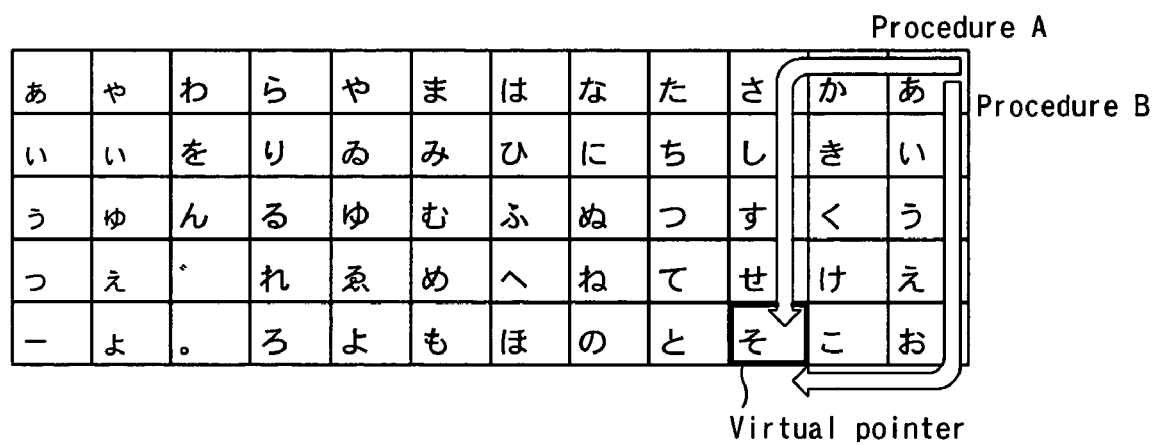
FIG. 7 is a schematic diagram showing an example of a route through which the virtual pointer moves to a desired symbol.

To select "そ", as shown in FIG. 7, the symbol selector 1 may move the virtual pointer twice in the "−Y direction" ("あ"→"う"→"さ") and then four times in the "−X direction" ("さ"→"し"→"す"→"せ"→"そ") (procedure A). Alternatively, the symbol selector 1 may move the virtual pointer four times in the "−X direction" ("あ"→"い" (uttered as "i")→"う"→"え" (uttered as "e")→"お" (uttered as "o")) and next twice in the "−Y direction" ("お"→"こ" (uttered as "ko")→"そ") (procedure B). Thus, the same character can always be selected if the total of the manipulations in the X and Y directions is unchanged. Therefore, needless to say, the order of manipulations is not limited.

Figure 3:
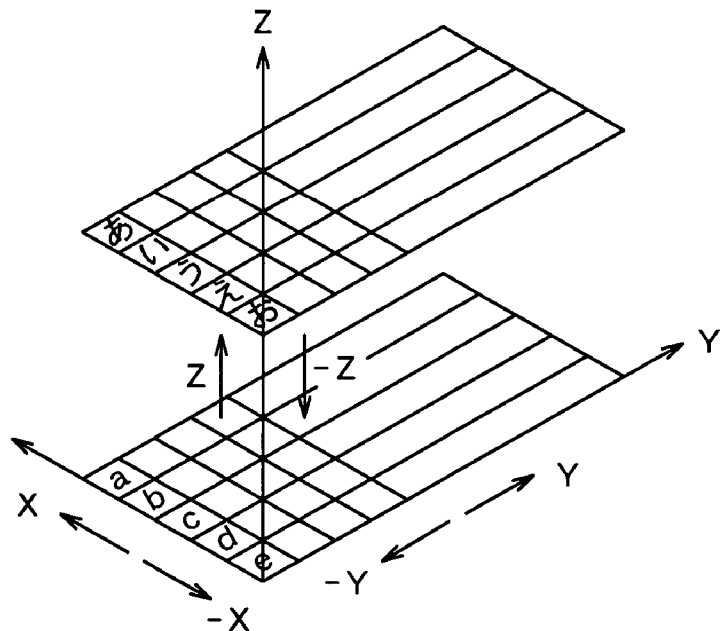
FIG. 3 is a schematic view showing an example of the layout of symbol lists.

A description will now be made of a case of selecting a numeral "1" after the character string "そうさ" is selected as described above. In the symbol list stored in the storage unit 10, the character list from which the "そうさ" is selected and the alpha-numeral list are hierarchized virtually in the vertical direction, as shown in FIG. 3.

The operator manipulates the manipulator unit 11 to move or swing down (such that a longitudinal line is drawn from the upper side to the lower side), to apply acceleration to the manipulator unit 11 in the negative direction in the Z axis. The sensor unit 12 detects acceleration per unit of time that is applied to the manipulator unit 11, and supplies the detection result to the motion direction determination unit 22. Based on the detection result supplied from the sensor unit 12, the motion direction determination unit 22 determines the motion direction of the virtual pointer to be the "−Z direction", and outputs the determination result to the motion unit 23. The motion unit 23 moves the virtual pointer from the character "あ" in the character list to the numeral "1" in the alpha-numeral list, based on the character "あ" stored in the memory (and pointed currently by the virtual pointer) and the determination result supplied from the motion direction determination unit 22. The result of this motion is outputted rapidly on the display unit 14, and "1" is displayed on the display unit 14.

The selection unit 24 selects the numeral "1" pointed to by the virtual pointer, in response to a manipulation made by the operator (e.g., the manipulator unit 11 is moved quickly twice downward (in the −Z direction)). After the symbol is selected by the selection unit 24, the virtual pointer returns to the initial state (where "あ" is selected).

The symbol selector 1 constructed in this structure has: the storage unit 10 which stores the symbol list consisting of predetermined arrayed symbols; the manipulator unit 11 for manipulating the virtual pointer which moves over the symbol list stored in the storage unit 10; the sensor unit 12 which detects acceleration per unit of time applied to the manipulator unit 11; the processing unit 13 which determines the motion direction of the virtual pointer and moves the virtual pointer to a desired symbol, based on the detection result from the sensor unit 12; and the display unit 14 which displays at least the symbol currently pointed to by the virtual pointer. Therefore, the direction in which the manipulator unit 11 is manipulated by the operator can be detected exactly. In addition, the virtual pointer moves over the symbol list having the known array of symbols. Therefore, even if the whole symbol list is not displayed on the display unit 14, the operator can understand intuitively the direction and position where the desired symbol should be selected. Accordingly, the symbol selector 1 to which the present invention is applied can be used in a portable information terminal which has only a restricted display space.

The invention claimed is:

1. A symbol selector tangibly embodied on a computer-readable storage medium, comprising:
   a storage unit which stores a symbol list including predetermined arrayed symbols;
   a manipulator unit for manipulating a pointing position of a virtual pointer which moves virtually over the symbol list stored in the storage unit;
   a sensor unit which detects acceleration per unit of time that is applied to the manipulator unit;
   a motion direction determination unit which determines a motion direction of the virtual pointer based on a detection result from the sensor unit;
   a motion unit which moves the virtual pointer in units of symbols in the motion direction determined by the motion direction determination unit; and
   a selection unit which selects a symbol currently pointed to the virtual pointer moved by the motion unit.

2. The symbol selector according to claim 1, further comprising a display unit which displays at least the symbol in the symbol list that is currently pointed to the virtual pointer.

3. The symbol selector according to claim 1, wherein the symbol list stored in the storage unit is formed of a fifty-Japanese character table and/or an alpha-numeral table.

4. The symbol selector according to claim 1, wherein
   in the symbol list stored in the storage unit, the symbols are arrayed for every predetermined word, and
   the manipulator unit manipulates the pointing position so as to move the virtual pointer in units of the predetermined words.

5. The symbol selector according to claim 1, wherein the symbol list stored in the storage unit includes the symbols arrayed in a matrix in planar directions, and is virtually hierarchal in a vertical direction into symbol list layers for respective types of symbols.

6. The symbol selector according to claim 5, further comprising a symbol list selection unit which selects one from the hierarchal symbol list layers, wherein
   the sensor unit detects acceleration in a planar or vertical direction, which is generated by manipulation of the manipulator unit,
   based on the detection result from the sensor unit, the motion direction determination unit determines the motion direction to be a direction in which the greatest acceleration is generated in the manipulation of the manipulator unit per unit of time, and
   if the motion direction determined by the motion direction determination unit is a vertical direction on the symbol list, the symbol list selection unit moves the virtual pointer from the one symbol list layer where the pointer is currently in to another symbol list layer positioned in the vertical direction.

7. The symbol selector according to claim 1, further comprising an output unit which outputs the symbol selected by the selection unit.

8. A symbol selection method comprising:
   manipulating a pointer corresponding to a virtual position shown on a display, for identifying a symbol, thereby causing the virtual position to move over a symbol list on the display, which includes a predetermined array of symbols in a memory;
   detecting an acceleration per unit of time of the pointer;
   determining a motion direction of the pointer over the symbol list based on the detected acceleration from the detecting step;
   moving the virtual position in units of symbols on the display in the motion direction determined in the motion direction determining step; and
   selecting a desired symbol when the virtual position identifies the symbol.

9. A symbol selector comprising:
   a display unit which displays at least one symbol in a symbol list corresponding to a virtual position;
   a storage unit which stores a symbol list comprising at least one array of symbols;
   a manipulator unit for using a pointer to manipulate a virtual position as the pointer moves over the symbol list displayed by the display unit;
   a sensor unit which detects acceleration per unit of time of the manipulator unit;
   a motion direction detection unit which determines the direction of motion of the pointer based on a detected result from the sensor unit;
   a motion unit which moves the virtual position in units of symbols in the motion of direction determined by the motion direction determination unit; and
   a selection unit which selects a symbol currently indicated by the virtual position.

10. The symbol selector according to claim 9, wherein the symbol list includes a plurality of arrayed symbols including a fifty-Japanese character table and/or an alpha-numeral table.

11. The symbol selector according to claim 9, wherein
   in the symbol list stored in the storage unit, the at least one array of symbol includes a symbol array for a plurality of predetermined words, and
   the manipulator unit manipulates the virtual position so as to move the virtual position in units of the predetermined words.

12. The symbol selector according to claim 9, including a plurality of symbol arrays where the symbol arrays are arranged in matrices in planar directions, and the matrices are arranged in the Z-direction in hierarchical layers.

13. The symbol selector according to claim 12, further comprising a symbol list selection unit which selects one from the hierarchal layers, wherein
   the sensor unit detects whether acceleration generated by manipulation of the manipulator unit is along a planar-axis or a z-axis, and
   when the motion direction determined by the motion direction determination unit is in the z-direction, the symbol list selection unit moves the virtual position from a first symbol array to another symbol array positioned in the detected direction of manipulation along the z-axis.

14. The symbol selector according to claim 9, wherein the motion direction determination unit identifies the direction of motion as the axis having the greatest acceleration based on the detected result from the sensor unit.

15. The symbol selector according to claim 9, further comprising an output unit which outputs the symbol selected by the selection unit.

* * * * *